United States Patent
Liu et al.

(10) Patent No.: US 9,692,563 B2
(45) Date of Patent: Jun. 27, 2017

(54) UPSTREAM CONTENTION MEASUREMENT REPORTING AND MITIGATION IN DOCSIS REMOTE PHY NETWORK ENVIRONMENTS

(71) Applicant: CISCO TECHNOLOGY, INC., San Jose, CA (US)

(72) Inventors: Tong Liu, Acton, MA (US); Hang Jin, Plano, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 127 days.

(21) Appl. No.: 14/680,873

(22) Filed: Apr. 7, 2015

(65) Prior Publication Data
US 2015/0295838 A1 Oct. 15, 2015

Related U.S. Application Data

(60) Provisional application No. 61/979,325, filed on Apr. 14, 2014.

(51) Int. Cl.
| | |
|---|---|
| *H04L 5/00* | (2006.01) |
| *H04L 27/34* | (2006.01) |
| *H04B 3/54* | (2006.01) |
| *H04L 27/26* | (2006.01) |
| *H04L 12/801* | (2013.01) |
| *H04L 12/807* | (2013.01) |
| *H04J 3/06* | (2006.01) |
| *H04L 12/28* | (2006.01) |

(52) U.S. Cl.
CPC ........... *H04L 5/0007* (2013.01); *H04B 3/542* (2013.01); *H04J 3/0667* (2013.01); *H04J 3/0673* (2013.01); *H04L 5/006* (2013.01); *H04L 12/2801* (2013.01); *H04L 27/2697* (2013.01); *H04L 27/3405* (2013.01); *H04L 27/345* (2013.01); *H04L 47/12* (2013.01); *H04L 47/27* (2013.01)

(58) Field of Classification Search
CPC ..................................................... H04L 5/0007
See application file for complete search history.

(56) References Cited

U.S. PATENT DOCUMENTS

| | | | |
|---|---|---|---|
| 6,529,520 B1 * | 3/2003 | Lee ..................... | H04L 12/5602 370/442 |
| 6,614,799 B1 * | 9/2003 | Gummalla ......... | H04L 12/2801 348/E7.07 |

(Continued)

*Primary Examiner* — Andrew Lai
*Assistant Examiner* — Andrew C Lee
(74) *Attorney, Agent, or Firm* — Patent Capital Group (57) ABSTRACT

An example method for upstream contention measurement and reporting in Data Over Cable Service Interface Specification (DOCSIS) remote physical layer (R-PHY) network environments is provided and includes receiving, at a Converged Cable Access Platform (CCAP) core from a R-PHY node over a converged interconnect network (CIN) in the DOCSIS R-PHY network environment, an indication of a collision level in an upstream network between the R-PHY node and a plurality of cable modems (CMs), calculating a congestion level in the upstream network based on the collision level indicated by the R-PHY node, adjusting back-off window parameters for cable modem retransmissions based on the calculated congestion level, and adjusting a contention transmission opportunity density in a downstream Media Access Protocol (MAP) message based on the adjusted back-off window parameters.

20 Claims, 5 Drawing Sheets

(56) References Cited

U.S. PATENT DOCUMENTS

| | | | |
|---|---|---|---|
| 6,742,187 B1 * | 5/2004 | Vogel | H04J 3/1694 348/E7.07 |
| 6,785,292 B1 * | 8/2004 | Vogel | H04L 12/2801 348/E17.001 |
| 6,801,537 B1 * | 10/2004 | Kubbar | H04W 74/085 370/252 |
| 7,104,534 B2 | 9/2006 | Currivan et al. | |
| 7,164,697 B1 * | 1/2007 | Beser | H04L 12/2801 370/485 |
| 7,420,986 B1 * | 9/2008 | Howard | H04L 12/2801 370/222 |
| 7,697,654 B1 * | 4/2010 | Jin | H04L 27/2647 375/298 |
| 7,903,682 B2 | 3/2011 | Beser | |
| 8,032,184 B2 * | 10/2011 | Na | H04B 7/0617 370/210 |
| 2001/0053511 A1 * | 12/2001 | Aoyagi | A61C 5/062 433/90 |
| 2001/0055319 A1 * | 12/2001 | Quigley | H04L 1/203 370/480 |
| 2002/0061012 A1 * | 5/2002 | Thi | H04B 3/23 370/352 |
| 2004/0264511 A1 * | 12/2004 | Futch | H04L 5/1438 370/535 |
| 2006/0126505 A1 * | 6/2006 | Denney | H04J 3/1694 370/229 |
| 2008/0192820 A1 * | 8/2008 | Brooks | H04N 7/17318 375/240.02 |
| 2010/0128739 A1 * | 5/2010 | Jung | H04L 12/2801 370/458 |
| 2013/0070604 A1 | 3/2013 | Lu et al. | |
| 2013/0070640 A1 * | 3/2013 | Chapman | H04L 12/2801 370/254 |
| 2013/0080620 A1 * | 3/2013 | Cook | H04N 21/2408 709/224 |
| 2013/0125194 A1 * | 5/2013 | Finkelstein | H04L 12/2801 725/129 |
| 2015/0295669 A1 | 10/2015 | Chapman et al. | |
| 2015/0295684 A1 | 10/2015 | Jin et al. | |
| 2015/0295746 A1 | 10/2015 | Chapman et al. | |

* cited by examiner

| FIELD | SIZE | FUNCTION |
|---|---|---|
| BURST STATUS | 8 BITS | Bit 7 -- Ranging/Probing Required<br>  0 = Ranging/Probing is not required<br>  1 = Ranging/Probing is required<br>Bit 6:5 – FEC Status (Pre Syndrome error-free/Post Syndrome error free<br>  00 = pass/pass, 10 = fail/pass, 11 = fail/fail<br>Bits 4:3 - Reserved<br>Bits 2:0 - Burst power bin level (allowing 8 levels comparing against 7 thresholds)<br>  000 = burst power below lowest threshold<br>  001 - 110 : burst power in between lowest and highest thresholds<br>  111 = burst power above highest threshold |

UPSTREAM CONTENTION MEASUREMENT REPORTING AND MITIGATION IN DOCSIS REMOTE PHY NETWORK ENVIRONMENTS

CROSS-REFERENCE TO RELATED APPLICATION

This application claims the benefit of priority under 35 U.S.C. §119(e) to U.S. Provisional Application Ser. No. 61/979,325 entitled "REMOTE PHY ARCHITECTURE," filed Apr. 14, 2014, which is hereby incorporated by reference in its entirety.

TECHNICAL FIELD

This disclosure relates in general to the field of communications and, more particularly, to upstream contention measurement reporting and mitigation in Data Over Cable Service Interface Specification (DOCSIS) Remote Physical layer (R-PHY) network environments.

BACKGROUND

Driven by market evolution towards triple-play services, cable operators in emerging markets are seeking standardized and digital fiber-based solutions for economical and future proof access technologies. Much of the demand is driven by the need to provide higher bandwidth packet transport for Internet connectivity, video and voice services. DOCSIS is an international telecommunications standard that has evolved to permit addition of high-bandwidth data transfer to an existing cable TV (CATV) system utilizing Quadrature Amplitude Modulation (QAM) and/or Quadrature phase-shift keying (QPSK) Radio Frequency (RF) modulation. It is employed by many cable television operators to provide Internet access over their existing hybrid fiber-coaxial (HFC) infrastructure. Traditionally, the DOCSIS system is a Point-to-Multipoint communications system, the corresponding standards defining Media Access Control (MAC)/PHY standards associated with providing high speed data over a hybrid fiber coaxial (HFC) network and is not naturally applicable for digital fiber. However, Cisco® remote-PHY (R-PHY) technology bridges the gap, leveraging existing Internet Protocol (IP) technologies to deploy data over digital fiber, enabling two-way services over cable.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for upstream contention measurement and reporting in DOCSIS R-PHY network environments is provided and includes receiving, at a Converged Cable Access Platform (CCAP) core from a remote physical layer (R-PHY) node over a converged interconnect network (CIN) in the DOCSIS R-PHY network environment, an indication of a collision level in an upstream network between the R-PHY node and a plurality of cable modems (CMs), calculating a congestion level in the upstream network based on the collision level indicated by the R-PHY node, adjusting back-off window parameters for cable modem retransmissions based on the calculated congestion level, and adjusting a contention transmission opportunity density in a downstream Media Access Protocol (MAP) message, for example, to bound a transmission back-off delay for CM retransmissions based on the adjusted back-off window parameters.

As used herein, the term "collision" refers to an instance of occurrence of overlapping (e.g., in time) signal transmissions by two or more cable modems. In data and voice networks using contention based request slots in a shared access media, such as for example cable networks, signals can collide when attempting to randomly access the shared access network at approximately the same time. As used herein, a "transmit opportunity" refers to any mini-slot in which one or more CMs may be allowed to start a transmission.

Example Embodiments

Figure 1:
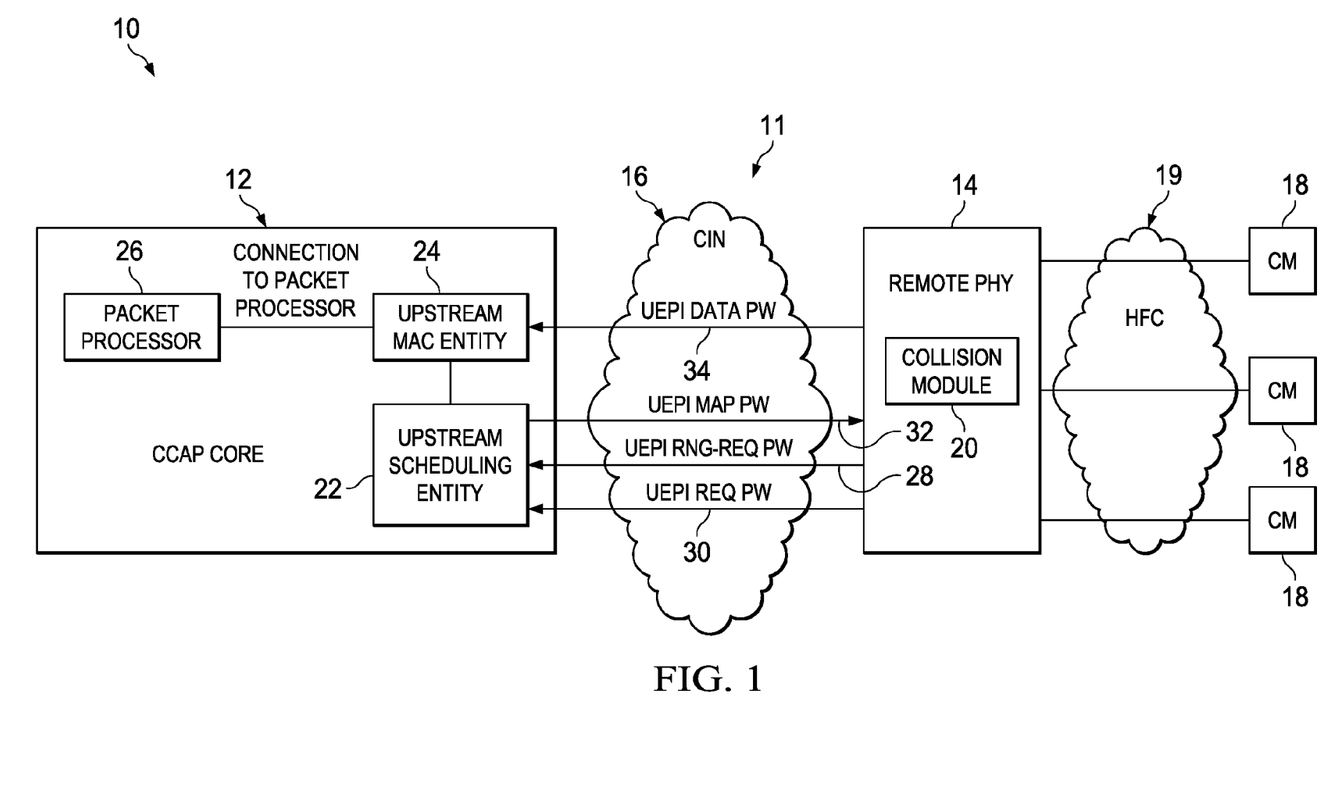
FIG. 1 is a simplified block diagram illustrating a communication system for upstream contention measurement and reporting in DOCSIS R-PHY network environments.

Turning to FIG. 1, FIG. 1 is a simplified block diagram illustrating a communication system 10 for upstream contention measurement and reporting in DOCSIS R-PHY network environments in accordance with one example embodiment. FIG. 1 illustrates a network 11 (indicated generally by an arrow) facilitating communication between a Converged Cable Access Platform (CCAP) core 12 and an R-PHY node 14, located in separate chassis potentially in different physical locations and connected over digital fiber (e.g., Ethernet link) over a converged interconnect network (CIN) 16. CIN 16 comprises a Layer 2 network or a Layer 3 network.

In some embodiments, a Layer 2 Tunneling Protocol version 3 (L2TPv3) tunnel ("pseudo-wire" connection) between CCAP core 12 to R-PHY node 14 can provide messages in a downstream direction (Downstream External Physical Interface (DEPI)) from CCAP core 12 to R-PHY node 14 and/or an upstream direction (Upstream External Physical Interface (UEPI)) from R-PHY node 14 to CCAP core 12. CCAP core 12 and R-PHY node 14 together comprise a CCAP, which is typically a combination of a DOCSIS cable modem termination system (CMTS) and an edge QAM (EQAM). Media Access Control (MAC) and higher-layer functions of the CMTS are located in CCAP core 12. R-PHY node 14 connects to one or more cable modems (CMs) 18 over coaxial cables of a hybrid fiber-coaxial (HFC) network 19.

To explain generally, communication system 10 uses channels to transmit signals (e.g., messages) between the CCAP (e.g., comprising CCAP core 12 and R-PHY node 14) and CMs 18. Each channel is a separate path through which signals can flow. In cable modem systems, such as communication system 10, data service is delivered to the customer premises equipment through channels in a coaxial cable or optical fiber cable (or other suitable medium), with separate channels for upstream transmission (e.g., towards CCAP core 12) and downstream transmission (e.g., away from CCAP core 12). When R-PHY node 14 receives signals from CMs 18, it converts the signals into Internet Protocol (IP) packets, which are then sent to CCAP core 12 and on to an IP router for transmission across the Internet. The downstream signals from R-PHY node 14 to CMs 18 are modulated for transmission across HFC network 19 to CMs 18.

In typical cable modem systems, the upstream channel is characterized by many CMs 18 transmitting to CCAP core 12. Because a number of CMs 18 share a single upstream transmission channel, an arbitrated mechanism is used to assure each modem of opportunities to transmit. Typically, the upstream signals operate in a burst mode of transmission. Timing in the upstream channels is slotted, with usage over each upstream interval controlled appropriately. In other words, the upstream transmission channel is treated as a sequence of contiguous mini-slots of time.

CCAP core 12 sends out periodic Media Access Protocol (MAP) messages that describe how an upcoming series of mini-slots is to be used (e.g., describing transmission opportunities in upstream channels). The MAP messages are periodically sent out as part of bandwidth allocation and management in network 11, defining transmission availability of upstream channels for specific periods of time (e.g., time slots described as mini-slots). A typical MAP message may grant some mini-slots for exclusive use of particular CMs 18 that have indicated in prior request frames that they have data ready to transmit requiring a number of mini-slots to transmit. The MAP message may also set aside some mini-slots for CMs 18 to use in contention mode and yet others that may be used only by new CMs 18 signaling that they wish to join the network. During a contention time slot, collisions between two or more signal transmissions from CMs 18 may occur. The collisions are caused by two or more signal transmissions from CMs 18 arriving simultaneously at R-PHY node 14 such that portions (including all) of the signal transmissions overlap in time, adding or interfering with each other.

Turning to DOCSIS standards, two types of contention regions during which collisions can occur for upstream access are specified in the DOCSIS standards, namely, Initial Ranging Region and Bandwidth request Region. The Initial Ranging region is intended for "new" CMs 18 (e.g., CMs 18 joining network 11) to send the first ranging request without any prior knowledge of timing, power and frequency offsets relative to CCAP core 12. The contention Bandwidth request region allows CMs 18 to request bandwidth in the absence of piggyback request opportunities. Congestion may occur with many CMs 18 contending at the same time to communicate with CCAP core 12, for example, in the case of a regional power outage, when many CMs 18 are trying to come back online at the same time.

The contention mitigation according to DOCSIS relies on CMs 18 to detect collisions. Each of CMs 18 may calculate a random offset based on the data back-off start field; after expiry of the random offset, CMs 18 may transmit a request for bandwidth. The random offset serves to minimize request collisions between different CMs 18 transmitting requests based on the same MAP message, because if transmissions from more than one of CMs 18 arrive at R-PHY node 14 simultaneously (or approximately simultaneously), the requests collide and can be lost.

CCAP core 12 does not receive the lost requests and thus, does not respond with appropriate responses. After a predetermined time interval (referred to as the collision detection delay), during which CMs 18 sending the colliding requests do not receive a response, CMs 18 randomly defer a number of transmit opportunities using a truncated binary exponential back-off algorithm before re-transmitting. For both initial ranging and bandwidth request contention, upon each collision, CMs 18 increment their respective internal back-off windows by one, from the back-off start parameter to the back off end parameters provisioned by CCAP core 12. For example, the back-off window size is increased by a factor of 2. CMs 18 recalculate a new random offset within the new back-off window and after a number of contention transmission opportunities equal to the random offset has elapsed, a new request is transmitted. CMs 18 continue the contention resolution until each receives an appropriate response from CCAP core 12, or a preconfigured number of attempts have been made unsuccessfully.

The collision detection delay includes the duration from the time any of CMs 18 makes a request to receiving feedback about the success or failure. For initial ranging, if no ranging response is received after a predetermined time interval (default to 200 ms), a collision is declared. For the contention bandwidth request, CMs 18 declare a collision when the next MAP with an acknowledgement (ACK) time indicating that the request would have been received and processed fails to include an acknowledgment of the previously sent request.

In integrated CTMS (e.g., with CCAP core 12 and R-PHY node 14 located in the same chassis, unlike embodiments of communication system 10), the collision detection delay includes the round trip propagation delay between R-PHY node 14 and CMs 18, the bandwidth request and MAP processing delay, and MAP round up delay. The MAP roundup delay can arise because MAPs are built at discrete intervals, and if a bandwidth request is not processed prior to building the current MAP, it has to wait for an entire MAP interval, for example 2 ms, to be scheduled into the next MAP. However, where CCAP core 12 and R-PHY node 14 are separated by CIN 16, as in embodiments of communication system 10, an extra delay in CIN 16 is introduced into the contention resolution operations, causing much longer contention feedback loop, compared to conventional integrated CMTS. Longer feedback delay can cause longer collision detection delay, resulting in slower service access.

The contention region access delay for any one of CMs 18 can be expressed by the following equation:

$$AccessDelay = \sum_{j=1}^{N} BackOffDelay_j + (N-1) * CollisonDectionDelay + ReqGrantDelay$$

Where, N is the total number of retransmission attempts by the CM in contention regions for sending an Initial Ranging request or a bandwidth request;

BackOffDelay$_j$ is the random back off delay for the j$^{th}$ transmission, which can be further expressed as the sum of the transmission opportunity delays (TxOpportunityDelay) in the corresponding back-off window, during which the CM has to wait before retransmission:

$$BackOffDelay_j = \sum_{i=1}^{ij} TxOpportunityDelay_{ij}$$

CollisionDetectionDelay is the duration between the CM sending a request to the time when collision is detected by the CM;

RequestGrantDelay is the duration between the CM sending a request to the actual data reaches CCAP core 12. It equals the contention bandwidth request detection delay plus the data transmission time at the CM and the propagation delay from the CM to R-PHY node 14 and the CIN delay from R-PHY node 14 to CCAP core 12.

The extended feedback delay between contending CMs 18 and CCAP core 12 directly contributes to CollisionDetectionDelay and RequestGrantDelay, where the number of retransmissions further multiplies CollisionDetectionDelay. On the other hand, the BackOffDelay is related to the back-off window and the density of the transmission opportunities scheduled in MAP messages, independent of feedback delay. The more frequently the transmission opportunities are scheduled, the lesser the time each of CMs 18 has to wait before retransmission.

Embodiments of communication system 10 can resolve such issues (among others) to facilitate upstream contention measurement and reporting in DOCSIS R-PHY network environment 11. In various embodiments, R-PHY node 14 includes a collision module 20 that senses the signal transmissions and detects collisions. Collision module 20 computes a collision level and reports the collision level to CCAP core 12 via an upstream external PHY interface (UEPI). An upstream scheduling entity 22 in CCAP core 12 evaluates the congestion level, and dynamically adjusts a contention transmission opportunity scheduling density to bound transmission back-off delay at CMs 18. In some embodiments, upstream scheduling entity 22 may also dynamically adjust a back-off window for congestion control. Upstream scheduling entity 22 connects to an upstream MAC entity 24, which is connected to a packet processor 26.

In various embodiments, centralized congestion mitigation mechanisms attempt to reduce access delay in the R-PHY-CCAP core architecture of communication system 10. Various mechanisms for measuring and reporting channel congestion level and proactively reducing collision level and bounding retransmission delay via MAP messages may also be implemented. In some embodiments, retransmission delay of CMs 18 in upstream contention regions are bounded by trading off contention bandwidth allocation. Back-off window adjustment may be combined with contention transmission opportunity density adjustment in some embodiments. In some embodiments, the collisions are detected by an Orthogonal Frequency-Division Multiple Access (OFDMA) receiver in collision module 20. Further, embodiments of communication system 10 facilitate pushing collision levels to CCAP core 12 via the UEPI interface between CCAP core 12 and R-PHY node 14 over CIN 16.

Pseudowires (PWs) of the UEPI interface between CCAP core 12 and R-PHY node 14 over CIN 16 include various UEPI control plane messages, including a UEPI range request (RNG-REQ) PW 28, a UEPO REQ PW 30, a UEPI MAP PW 32 and a UEPI data plane message, UEPI data PW 34. Note that PWs refer to communications over an IP tunnel over CIN 16. UEPI data PW 34 is used to forward upstream traffic, e.g., data from CMs 18, to CCAP core 12 for further processing/forwarding by packet processor 26. UEPI RNG-REW PW 28 requests ranging information, for example, so that downstream CMs 18 can transmit upstream packets to arrive upstream within a scheduled time slot. UEPI REQ PW 30 carries any other requests from CMs 18.

UEPI MAP PW 32 provides scheduling information, such as time slots and contention periods to downstream CMs 18. MAP PW 32 may be converted into appropriate messages compatible with HFC network 19 and transmitted to CMs 18 by R-PHY node 14. Note that although the PWs are described as being separate, the underlying messages may be transmitted using the same physical connections in some embodiments. Each MAP PW 32 indicates a data back-off start field for use in a MAP message to CMs 18. The data back-off start field defines an initial back-off window for use in the contention resolution algorithm.

According to various embodiments, embodiments of communication system 10 facilitate reducing the total number of retransmission attempts by CMs 18 with relatively large initial back-off value, and allocating more frequent transmission opportunities to reduce the back-off delay. The contention mitigation approach takes advantage of the R-PHY UEPI interface and high bandwidth capacity on OFDMA channels. Instead of solely relying on collision detections and backing off by CMs 18, the content mitigation approach in various embodiments adopts a centralized approach to detect channel congestion condition, and proactively reduces the collision rate and limit retransmission back off time of CMs 18 by adjusting the back off window parameters and the density of contention transmission opportunities. In example embodiments, the following steps are included: (1) collision detection at R-PHY upstream receivers in R-PHY node 14; (2) collision level reporting via UEPI; (3) congestion determination at CCAP-core 12; and (4) congestion control via MAP's contention region and back-off window parameter adjustment.

In various embodiments, collision detection can be implemented at R-PHY node 14 using any suitable known mechanisms, including PHY matrix such as received signal power, signal-to-noise ratio (SNR), packet header checksum (HCS), cyclic redundancy check (CRC), etc. A sliding window averaging algorithm may be used to calculate the collision level, the ratio of the number collisions Nc to the last Ntx number of contention transmit opportunities. Using the collision level (e.g., instead of the absolute number of collisions) can help reduce the number of bits required for reporting the channel collision condition. In an example embodiment, Ntx can be set to a power of 2, for example, for the sake of easy implementation.

Some embodiments of communication system 10 may implement conventional initial ranging collision detection mechanisms, which use received power levels to detect collisions, with higher power detected at a transmission opportunity indicating a higher likelihood of more than one burst being received simultaneously, thereby indicating a collision. A coarse mapping between the received power level and the collision ratio can be established via signal analysis or system testing.

In other embodiments of communication system 10, a more accurate collision detection circuitry may be implemented that detects presence of a valid initial ranging signal, and determines the collision via CRC checking and a predetermined power level threshold. A collision is detected if a valid initial ranging signal (e.g., power or SNR above respective predetermined thresholds) is present and CRC fails. No burst is concluded if a valid initial ranging signal is not detected, and a valid burst is declared if the CRC passes. The more accurate collision detection mechanism can eliminate inaccuracy associated with the power level approach, for example false collision detection when CMs 18 transmit at high power, or misses when contending CMs 18 transmit at lower power.

In various embodiments, the received signal power level and HCS checking can be used for collision detection of bandwidth requests. Collisions may be indicated if the power level is high (e.g., higher than a predetermined power level threshold) and the HCS fails. No burst is concluded if the power level is low (e.g., lower than a predetermined power level threshold) and the HCS fails and a valid burst is declared if the HCS passes.

Corrupted packets due to collisions are not sent to CCAP core 12 and are discarded by R-PHY node 14. In various embodiments, a reporting mechanism is implemented to alert CCAP core 12 regarding the collisions. A polling approach is attempted in traditional integrated CTMS to read PHY receiver hardware registers; however it has the following limitations: direct bus access is not available in the RPHY system and a special packet interface is required to read the hardware registers; extra processor and network overhead may be required at CCAP core 12 to imitate the register polling in communication system 10. Moreover, with no immediate feedback, channel collision level detection delay can rely on the polling interval; however, frequent polling increases processor load and bandwidth cost on the control path.

Various embodiments of communication system 10 use a pushing mechanism to allow R-PHY node 14 to report the collision level in a UEPI header or trailer segment associated with the successfully received initial ranging packets or bandwidth request packets. The pushing mechanism is adopted in DOCSIS3.1 UEPI Specification for OFDMA channel operations. Accordingly, a trailer segment of UEPI RNG-REQ PW 28 on an OFDMA channel has an optional 3-bit burst power bin level filed in a 'Burst Status' byte. The 3-bit field can be used to coarsely evaluate the collision level with the burst power bin level or overloaded with more precise collision level calculations. The reported congestion level can be a running average over the last Ntx number of transmission opportunities, and reported in the UEPI trailer segment of successfully received initial ranging requests.

In DOCSIS3.1 UEPI Specification, an optional 3-bit Collision Level Field is added to UEPI REQ PW 30 for OFDMA channel. The 3-bit field reports one of several (e.g., 8) collision levels comparing various (e.g., 7) thresholds provisioned to R-PHY node 14. R-PHY node 14 may obtain the collision level with a sliding window to calculate the collision percentage over the last Ntx contention transmit opportunities. In some embodiments, Ntx may be set to power of 2 up to a maximum of 256 for easy implementation.

Upstream scheduling entity 22 in CCAP core 12 estimates the upstream congestion level (CL) as a ratio of the collision level (Lc) to a success level (Ls). Lc is reported from R-PHY node 14. Ls is calculated at CCAP core 12 as a ratio of a number of successfully received requests at CCAP core 12 to the last Ntx number of transmission opportunities scheduled.

$$CL=Lc/Ls=(Nc/Ntx)/(Ns/Ntx)=Nc/Ns$$

CL is calculated to be a ratio of the number of collisions (Nc) to the number successful requests (Ns).

Based on the congestion level, the contention mitigation can comprise (1) adjusting the channel back-off start parameters and communicating the adjusted value to contending CMs 18 using MAP PW 32 to R-PHY node 14 and MAP messages thereafter to achieve a desired congestion level; and (2) adjusting the MAP contention transmission opportunity density to achieve a desired worst-case transmission back off delay.

A known mechanism for adjusting channel back-off parameters using the channel congestion level may be implemented by upstream scheduling entity 22 in CCAP core 12. The operation may include the following steps: calculate congestion level; If the congestion level is greater than a predetermined high threshold (CL>CongestionHighThreshold), adjust the back-off start value to be a minimum of the previously calculated back-off start value incremented by a predetermined step size and a preconfigured maximum back-off start value (BackoffStart=MIN (BackOffStart+StepSize, MaxStartValue)); if the congestion level is lower than a predetermined low threshold (CL<CongestionLowThreshold), adjust the back-off start value to be a maximum of the previously calculated back-off start value decremented by the predetermined step size and a preconfigured minimum back-off start value (BackoffStart=MAX (BackOffStart−StepSize, MinStartValue); and adjust the back-off end value to be a minimum of a preconfigured maximum end value and the back-off start value incremented by a preconfigured maximum back-off window size (BackoffEnd=MIN (MaxEndValue, BackoffStart+MaxStartAdjustSize).

The preconfigured Con gestionHighThreshold value and the CongestionLowThreshold value bound a preconfigured congestion window. Thus, CCAP core 12 attempts to achieve a desired collision level by adjusting the transmission back off parameters of the contention resolution algorithm executed by CMs 18 if the calculated congestion level falls outside the preconfigured congestion window. The CongestionHighThreshold is the congestion level threshold to increase the back-off window. A typical value for CongestionHighThreshold is approximately 0.7; however, the value can be set lower for better contention performance by trading off bandwidth consumption of the contention transmission opportunities. The CongestionLowThreshold is the congestion level threshold to decrease the back-off window. The value can be set lower than typical values for better contention performance by trading off bandwidth consumption of the contention transmission opportunities. The calculated BackOffStart and BackOffEnd values are transmitted to CMs 18 in UEPI MAP PW 32 over CIN 16 to R-PHY node 14, and through appropriate MAP messages over HFC network 19 thereafter.

Upstream scheduling entity 22 further adjusts the contention transmission opportunities to minimize the back-off delay for retransmission by CMs 18. Note that "contention transmit opportunity" comprises any sub-slot in a contention region that a CM is allowed to use to start a transmission. The number of contention transmission opportunities can be dependent on a total size of the contention region and the sub-slot size of the associated contention burst type. For example, on an OFDMA channel, a 4-minislot contention bandwidth request region can hold 16 transmission opportunities, with each mini-slot containing 4 bandwidth request sub-slots. For initial ranging, CMs 18 start transmission in the first mini-slot of the region resulting in a single transmission opportunity.

A particular one of CMs 18 accessing the contention region sets its internal back-off window start value equal to the BackoffStart value specified in the MAP currently in effect, and increases its back-off window size (e.g., by a factor of 2), until the BackOffEnd value. The CM randomly selects a number within its back-off window bounded by BackoffStart and BackOffEnd. The random value indicates the number of contention transmit opportunities which the CM defers before transmitting.

In various embodiments, a maximum acceptable access delay (MaxBackOffDelay) is bound by the maximum number of contention transmission opportunities generated with the back-off window.

$$MaxBackOffDelay = \sum_{i=1}^{MaxTxBackoff} TxOpportunityDelay_i$$

Where, $MaxTxBackOff = 2^{BackOffEnd} - 1$

Upstream scheduling entity 22 in CCAP core 12 may use the relationship between the maximum acceptable access delay and transmission opportunities to adjust the density of transmission opportunities on a given channel for a given contention type to ensure MaxTxBackOff number of contention transmission opportunities in a MAP message during the MaxBackOffDelay interval. Such mechanisms can effectively limit a worst case random back off delay, thereby improving service access time and per modem upstream throughput.

Turning to the infrastructure of communication system 10, the network topology can include any number of cable modems, customer premises equipment, servers, switches (including distributed virtual switches), routers, and other nodes inter-connected to form a large and complex network. Network 11 represents a series of points or nodes of inter-connected communication paths for receiving and transmitting packets and/or frames of information that are delivered to communication system 10. A node may be any electronic device, computer, printer, hard disk drive, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Network 11 offers a communicative interface between cable modem network components, and may include any local area network (LAN), wireless local area network (WLAN), metropolitan area network (MAN), Intranet, Internet, Extranet, wide area network (WAN), virtual private network (VPN), or any other appropriate architecture or system that facilitates communications in a network environment. Network 11 may implement any suitable communication protocol for transmitting and receiving data packets within communication system 10. The architecture of the present disclosure may include a configuration capable of TCP/IP, TDMA, and/or other communications for the electronic transmission or reception information in a network. The architecture of the present disclosure may also operate in conjunction with any suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

In some embodiments, a communication link may represent any electronic link supporting a network environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In particular embodiments, CCAP core 12 may comprise a hardware appliance with appropriate ports, processors, memory elements, interfaces, and other electrical and electronic components that facilitate the functions described herein. In some embodiments, timing module 26 may comprise a hardware device or software application or combination thereof executing within CCAP core 12 to perform the operations described herein. In other embodiments, timing module 26 may comprise a hardware device or software application executing outside CCAP core 12, for example, in a separate appliance, server, or other network element and coupled (e.g., connected to, in communication with, etc.) to CCAP core 12 in network 11.

R-PHY node 14 may comprise suitable hardware components and interfaces for facilitating the operations described herein. In some embodiments, R-PHY node 14 may be embedded in or be part of another hardware component, such as a broadband processing engine (comprising a motherboard, microprocessors and other hardware components). In some embodiments, R-PHY node 14 comprises downstream and upstream PHY, deployed in a Coaxial Media Converter (CMC) that supports RF functions at the PHY layer.

Figure 2:
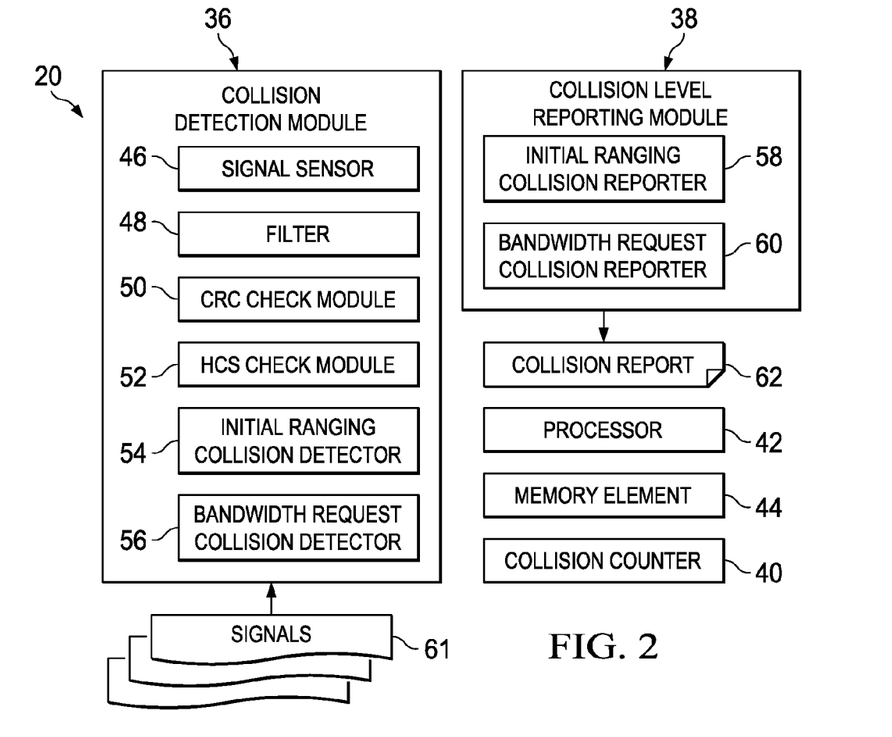
FIG. 2 is a simplified block diagram illustrating example details of embodiments of the communication system.

Turning to FIG. 2, FIG. 2 is a simplified block diagram showing example details of collision module 20 according to an embodiment of communication system 10. Collision module 20 includes a collision detection module 36, a collision level reporting module 38, a collision counter 40, a processor 42 and a memory element 44. Note that in many embodiments, various operations described herein may be performed in appropriate hardware digital signal processors (DSPs) or application specific integrated circuits (ASICs) in R-PHY node 14, which are encompassed by processor 42 and memory element 44. Collision detection module 36 includes a signal sensor 46, a filter 48, a CRC check module 50, a HCS check module 52, an initial ranging collision detector 54, and bandwidth request collision detector 56. Collision level reporting module 38 includes an initial ranging collision reporter 58, and a bandwidth request collision reporter 60.

During operation, signal sensor 46 senses signals 61 from CMs 18 over HFC network 19. Signal sensor 46 can comprise one or more OFDMA receivers in some embodiments. Signal sensor 46 can detect power levels, phase, frequency and/or other parameters of interest in signals 61.

Filter 48 can filter out background noise from signals 61. CRC check module 50 performs CRC checks on signals 61. Initial ranging collision detector 54 detects initial ranging collisions from the signal power or SNR (and/or other suitable parameters) and the CRC check results. For example, if a valid initial ranging signal is detected (e.g., from power, SNR, or other suitable parameters), and the CRC check fails, a collision is detected. HCS check module 52 performs HCS checking. Bandwidth request collision detector 56 can detect bandwidth request collisions based on the signal power (and/or other suitable parameters) and HCS check results. For example, if the signal power is high and the HCS check fails, a collision is detected.

Collision counter 40 keeps track of the number of initial ranging request collisions and bandwidth request collisions detected by collision detection module 36. Collision counter 40 also includes a counter to count the number of transmission opportunities (Ntx) during a preconfigured calculation window. The collision level may be calculated as the ratio of the number of collisions Nc over the last Ntx number of transmission opportunities. Note that R-PHY node 14 intercepts (e.g., receives) MAP messages sent by CCAP core 12 via the MAP PW 32, which includes the transmission opportunities; thus, collision counter 40 at R-PHY node 14 tracks the transmission opportunities in the MAP messages over the preconfigured calculation window.

Initial ranging collision reporter 58 computes the initial ranging collision level during the preconfigured calculation window and generates UEPI RNG REQ PW 28 with the calculated collision level value in an appropriate field therein. Bandwidth request collision reporter 60 computes the bandwidth request collision level during the preconfigured calculation window and generates UEPI REQ PW 30 with the calculated collision level in an appropriate field therein. UEPI RNG REQ PW 28 and UEPI REQ PW 30 comprising collision report 62 are sent to CCAP core 12 over CIN 16. Note that the actual number of collisions Nc may not be included in the reports, for example, to reduce bandwidth consumption, decrease latency, etc.; rather a smaller number, namely, a ratio of Nc to Ntx may be included in the reports, and CCAP core 12 may calculate the congestion level based on the collision level (Nc/Ntx) reported in collision report 62.

Figure 3:
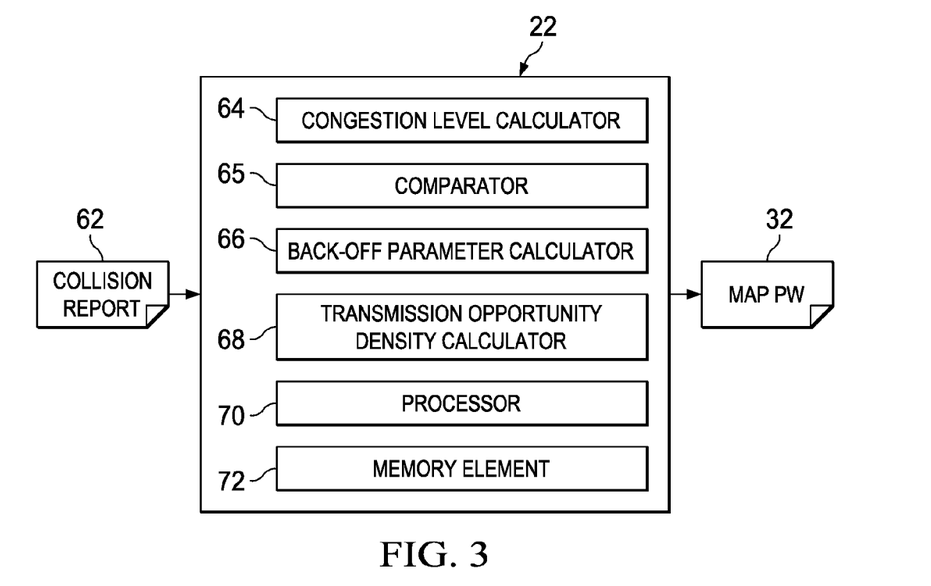
FIG. 3 is a simplified block diagram illustrating other example details of embodiments of the communication system.

Turning to FIG. 3, FIG. 3 is a simplified block diagram showing example details of upstream scheduling entity 22 according to an embodiment of communication system 10. Upstream scheduling entity 22 comprises a congestion level calculator 64, a comparator 65, a back-off parameter calculator 66, a transmission opportunity density calculator 68, a processor 70 and a memory element 72. Note that in many embodiments, the various operations described herein may be performed in appropriate hardware DSPs, microprocessors, ASICs or equivalent integrated circuits (ICs) in CCAP core 12, which are encompassed by processor 70 and memory element 72.

During operation, upstream scheduling entity 20 receives collision report 62 from R-PHY node 14 over UEPI. Collision report 62 includes the collision level Lc as detected by R-PHY node 14. Congestion level calculator 64 tracks the number (Ns) of successfully received requests and the number (Ntx) of the transmission opportunities scheduled in the last MAP PW 32 that was sent out by CCAP core 12 to R-PHY node 14. Congestion level calculator 64 derives the number of collisions (Nc) from the collision level in collision report 62 and the tracked Ntx (Nc=Lc×Ntx) and calculates the congestion level CL as the ratio of Nc to Ns.

A high threshold for the congestion level (CongestionHighThreshold) and a low threshold for the congestion level (CongestionLowThreshold) may also be preconfigured in upstream scheduling entity 22. Comparator 65 compares the calculated congestion level with the preconfigured congestion thresholds. If the calculated congestion level is greater than CongestionHighThreshold, or less than CongestionLowThreshold, back-off parameter calculator 66 is activated (e.g., called, triggered, etc.).

Back-off parameter calculator 54 calculates the BackOffStart value and the BackOffEnd value for the back-off window to be used by CMs 18 to compute the random back-off value for retransmissions. The BackOffStart value and the BackOffEnd value describe the bounds of the back-off window. Note that in many embodiments, an initial BackOffStart value, a step size (StepSize) for the iterations, a maximum BackOffStart value (MaxStartValue), a minimum BackOffStart value (MinStartValue) and a maximum back-off window size (MaxStartAdjustSize) may be preconfigured in upstream scheduling entity 22 by the network or other human administrator. The calculated BackOffStart and BackOffEnd values are transmitted to CMs 18 in MAP PW 32 over CIN 16 to R-PHY node 14, and through appropriate MAP messages over HFC network 19 thereafter.

Transmission opportunity density calculator 68 calculates a density of transmission opportunities to be included in MAP PW 32 (and corresponding MAP messages to CM 18). In an example embodiment, the BackOffEnd value calculated by back-off parameter calculator 66 is used to calculate the maximum transmission opportunities (MaxTxBackOff) in the back-off window. Given a preconfigured maximum access delay (MaxBackOffDelay) (e.g., 500 ms), transmission opportunity density calculator 68 adjusts the density of transmission opportunities on a given channel for a given contention type to ensure MaxTxBackOff number of contention transmission opportunities during the MaxBackOffDelay interval.

Figure 4:
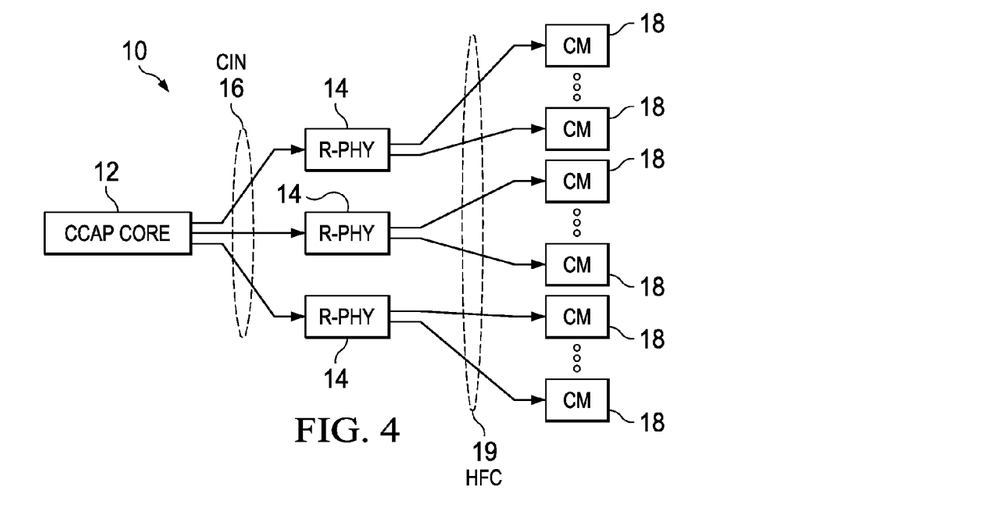
FIG. 4 is a simplified block diagram illustrating yet other example details of embodiments of the communication system.

Turning to FIG. 4, FIG. 4 is a simplified block diagram showing example details according to an embodiment of communication system 10. CCAP core 12 may connect to (e.g., communicate with) a plurality of R-PHY nodes 14 over CIN 16. Each R-PHY node 14 may connect to (e.g., communicate with) a plurality of CMs 18 over HFC network 19. Each R-PHY node 14 may calculate the collision level with its respectively connected CMs 18, and transmit the collision level in appropriate collision report 62 to CCAP core 12. CCAP core 12 may separately calculate the back-off parameters and transmission opportunity densities for each R-PHY node 14, and transmit separate MAP PWs 32 including the respective calculated back-off parameters and transmission opportunities.

Figure 5:
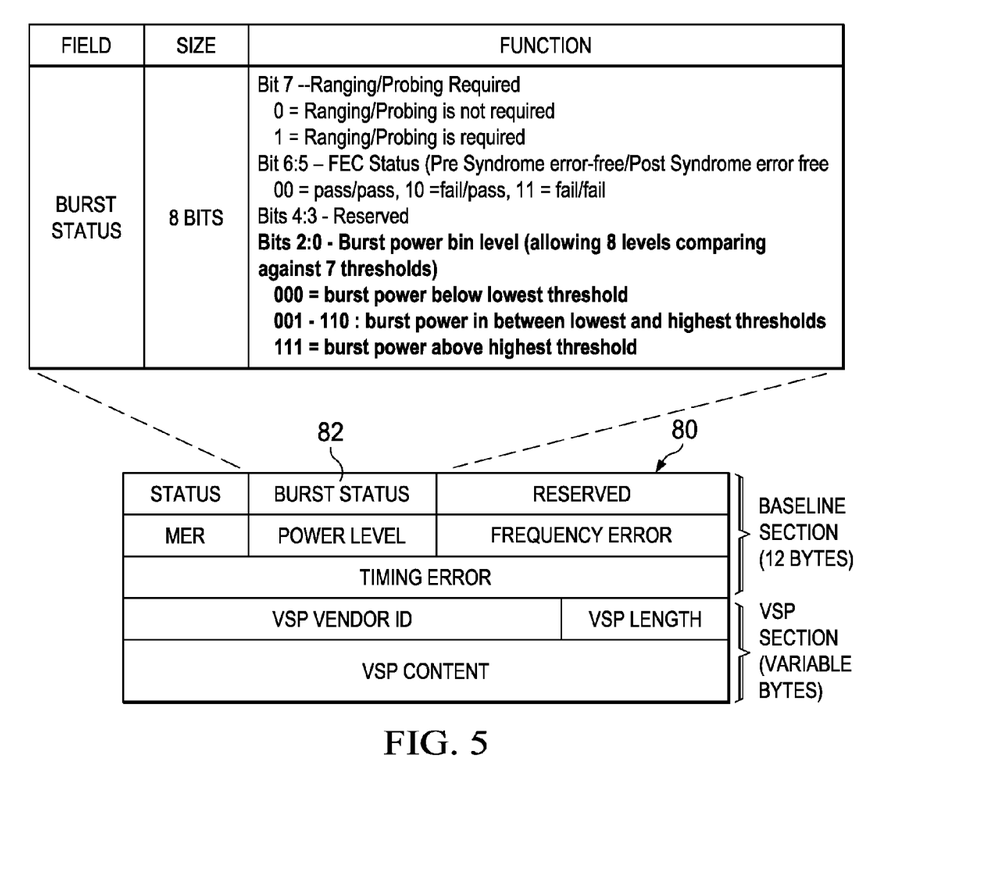
FIG. 5 is a simplified block diagram illustrating yet other example details of embodiments of the communication system.

Turning to FIG. 5, FIG. 5 is a simplified block diagram showing example details according to an embodiment of communication system 10. UEPI RNG-REQ PW specifications for a DOCSIS 3.1 OFDMA channel allows R-PHY node 14 to send a burst received on that channel to CCAP core 12 using a transmission unit in UEPI RNG-REQ PW 32. In a general sense, the UEPI PW includes a header segment, followed by one or more payload segments, followed by a trailer segment. According to various embodiments, UEPI RNG-REQ PW 32 may include a trailer segment 80 that includes a burst status field 82 indicating power levels (or other suitable parameters indicating a burst) in appropriate bits thereof.

In an example embodiments, burst status field 82 may comprise 8 bits, with 3 of the bits (e.g., bits 0, 1 and 2) indicating a power level of the burst signal (e.g., sensed in signals 61 at R-PHY node 14), allowing 8 levels to be compared against 7 thresholds. For example, a value of 000 indicates burst power is below a preconfigured lowest threshold; a value of 001-110 indicates burst power in between lowest and highest thresholds; and a value of 111 indicates that burst power is above a preconfigured highest threshold.

According to various embodiments, the 3 bit burst status field 82 can be used to coarsely evaluate the collision level with the burst power bin level, or overloaded with more precise collision level calculations. The reported collision level may be a running average over the last Ntx number of transmission opportunities and reported by R-PHY node 14 in UEPI trailer segment 80 of a successfully received initial ranging request.

Figure 6:
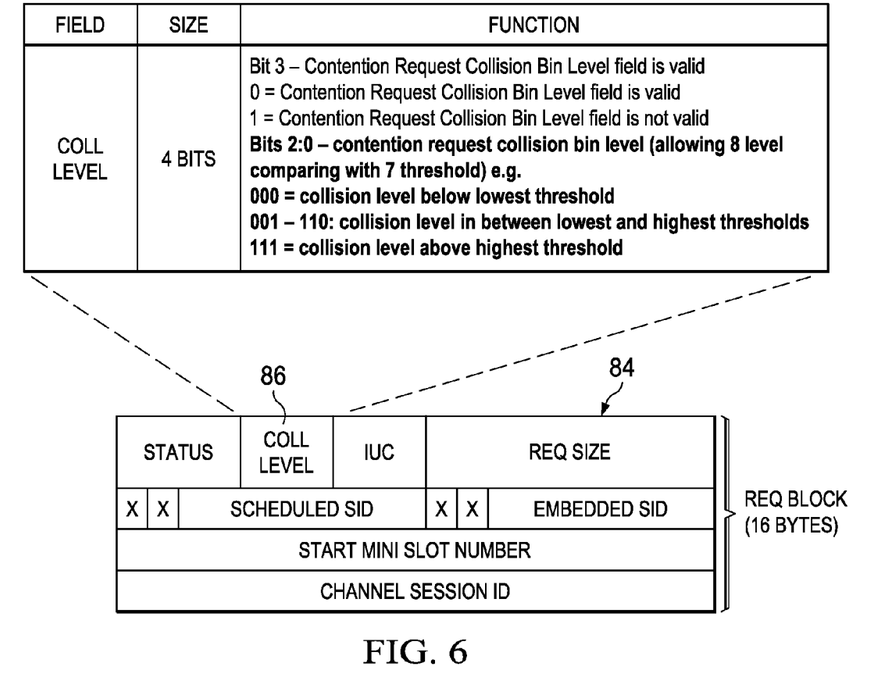
FIG. 6 is a simplified block diagram illustrating yet other example details of embodiments of the communication system.

Turning to FIG. 6, FIG. 6 is a simplified block diagram showing example details according to an embodiment of communication system 10. In a general sense, the UEPI REQ PW 30 is used for aggregating request information from the upstream data path into a dedicated PW. Each instance of a request in the upstream path (e.g., in HFC network 19), either a stand-alone request or a piggyback request, is mapped into a Request Block 84 in UEPI REQ PW 30. Request Block 84 includes a collision field 86 that can indicate the collision level of requests from CMs 18.

In an example embodiment, collision field 86 comprises 4 bits, with 3 of the bits indicating a contention request collision bin level, allowing an 8-level comparison with 7 thresholds. For example, a value of 000 indicates collision level is below a preconfigured lowest threshold; a value of 001-110 indicates collision level in between lowest and highest thresholds; and a value of 111 indicates that collision level is above a preconfigured highest threshold. R-PHY node 14 may obtain the collision level with a sliding window to calculate the collision percentage over the last N contention REQ opportunities.

Figure 7:
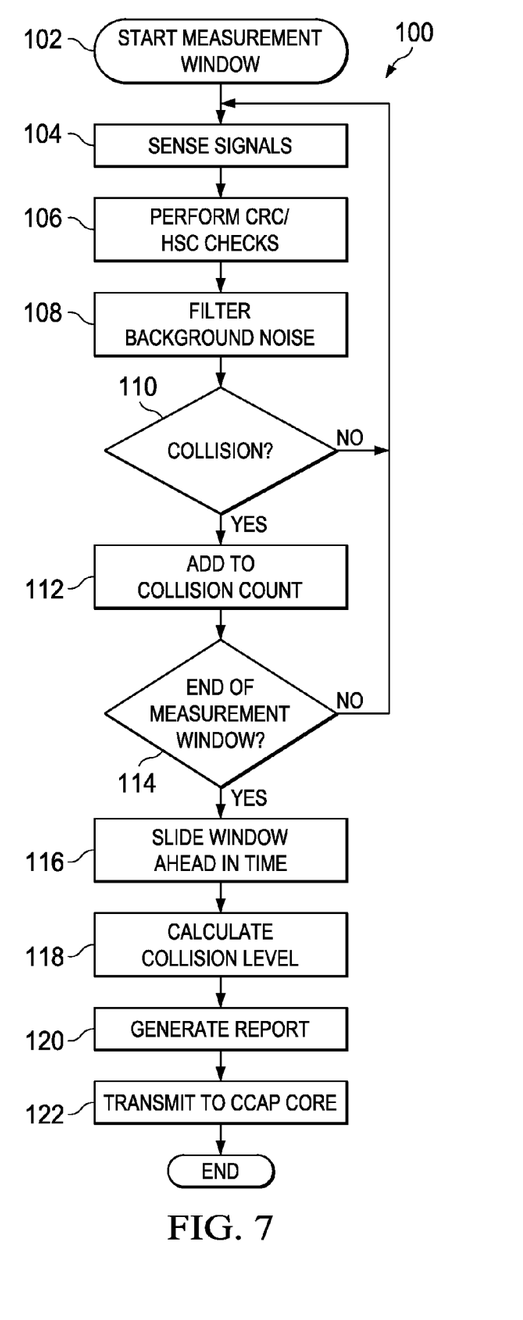
FIG. 7 is a simplified flow diagram illustrating example operations that may be associated with an embodiment of the communication system.

Turning to FIG. 7, FIG. 7 is a simplified flow diagram showing example operations 100 that may be associated with R-PHY node 14 according to an embodiment of communication system 10. At 102, R-PHY node 14 may start a measurement (e.g., time) window (e.g., preconfigured by a user, administrator, etc.). At 104, signal sensor 46 may sense signals 61 at interfaces on R-PHY nodes connected to HFC network 19. At 106, CRC check module 50 and HSC check module 52 may perform CRC checks and HSC checks respectively. At 108, filter module 48 may filter out background noise. At 110, initial ranging collision detector 54 and/or bandwidth request collision detector 56 may make a determination whether a collision has been detected. If no collision is detected, the operations revert to 104, wherein signals 61 are sensed.

On the other hand, if collisions are detected, at 112, collision counter 40 adds to the collision count stored therein. At 114, a determination may be made whether the measurement [time] window has ended. If not, the operations revert to 104, and continue thereafter. If the measurement [time] window is ended, at 116, the collision level Lc is calculated. At 118, collision report 62 is generated. For example, UEPI RNG-REQ PW 28 and UEPI REQ PW 30 are generated and populated in appropriate fields with the collision level values. At 120, collision report 62 is transmitted to CCAP core 12 in appropriate PWs. The operations may step to 102, whereupon a new measurement window is started and the operations continue thereafter.

Figure 8:
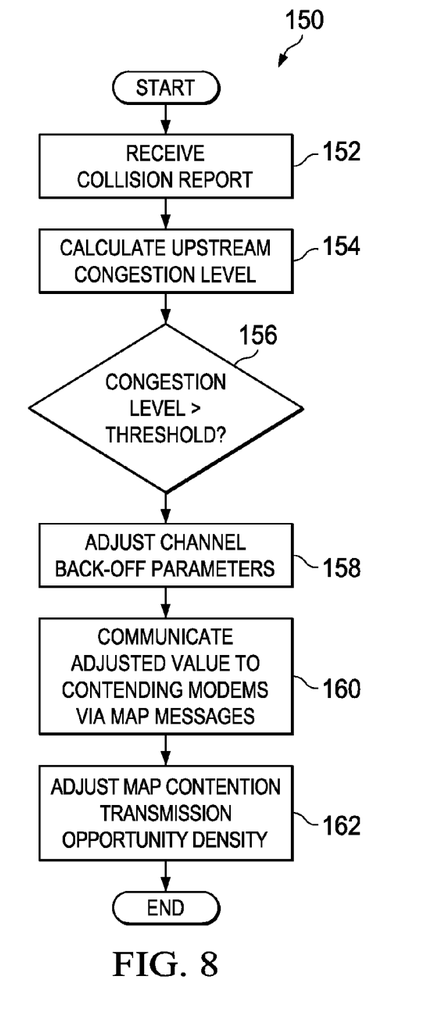
FIG. 8 is a simplified flow diagram illustrating example operations that may be associated with an embodiment of the communication system.

Turning to FIG. 8, FIG. 8 is a simplified flow diagram showing example operations 150 that may be associated with CCAP core 12 according to an embodiment of communication system 10. At 152, upstream scheduling entity 22 receives collision report 62. At 154, congestion level calculator 64 calculates congestion level CL based on the collision level indicated in collision report 62 and stored values of number of transmission opportunities and received successful requests. At 156, comparator 65 determines if the calculated congestion level is greater than the preconfigured maximum congestion threshold or less than the preconfigured minimum congestion threshold. If congestion level is within the preconfigured thresholds, the operations revert to 152.

If congestion level is not within the preconfigured thresholds, at 158, back-off parameter calculator 66 adjusts the channel back-off parameters, comprising the back-off window bounds for the relevant channel. In some embodiments, an initial back-off window parameters are preconfigured in CCAP core 12. The initial back-off window parameters are adjusted (e.g., changed, improved, etc.) based on measured collision levels in upstream HFC network 19. At 160, the adjusted values are communicated to contending CMs 18 via MAP messages (e.g., via MAP PW 32 in CIN 16 and appropriate MAP messages in HFC network 19). At 162, transmission opportunity density calculator calculates the number of transmission opportunities to be provided in the calculated back-off window and provides the same in the MAP transmissions to R-PHY node 14.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, R-PHY node 14 and/or CCAP core 12. In some embodiments, one or more of these features may be implemented in hardware, provided external to these elements, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, R-PHY node 14 and/or CCAP core 12 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 44, 72) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processors 42, 70) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
  receiving, at a Converged Cable Access Platform (CCAP) core from a remote physical layer (R-PHY) node over a converged interconnect network (CIN) in a Data Over Cable Service Interface Specification (DOCSIS) R-PHY network environment, an indication of a collision level in an upstream network between the R-PHY node and a plurality of cable modems (CMs);
  calculating a congestion level in the upstream network based on the collision level indicated by the R-PHY node;
  adjusting back-off window parameters for cable modem retransmissions based on the calculated congestion level; and
  adjusting a contention transmission opportunity density in a downstream Media Access Protocol (MAP) message based on the adjusted back-off window parameters, wherein the adjusting the contention transmission opportunity density comprises calculating a maximum number of contention transmission opportunities in a specific back-off window bounded by the adjusted back-off window parameters, and changing a value of the contention transmission opportunity density on a specific channel for a specific contention type to ensure the maximum number of contention transmission opportunities within a maximum acceptable access delay.

2. The method of claim 1, further comprising transmitting by the CCAP core to the R-PHY node, the downstream MAP message having the contention transmission opportunity density and including the adjusted back-off window parameters in an Upstream External Physical Interface (UEPI) MAP pseudowire (PW), wherein the contention transmission opportunity density bounds a transmission back-off delay at the CMs.

3. The method of claim 1, wherein the congestion level is calculated as a ratio of a number of collisions to a number of successful requests, wherein the collision level comprises a ratio of the number of collisions to a number of transmission opportunities indicated in at least one previously sent MAP message during a preconfigured calculation window.

4. The method of claim 1, wherein the back-off window parameters are adjusted if the calculated congestion level falls outside a preconfigured congestion window.

5. The method of claim 1, wherein the contention transmission opportunity density is adjusted to achieve the maximum acceptable access delay.

6. The method of claim 1, wherein the indication from the R-PHY node is received at the CCAP core in a UEPI PW.

7. The method of claim 1, wherein the R-PHY node detects collisions between initial ranging requests from the plurality of cable modems, wherein the detected initial ranging request collisions are indicated in a trailing segment of a UEPI ranging (RNG) request (REQ) PW.

8. The method of claim 7, wherein the R-PHY node detects the initial ranging request collisions using at least a cyclic redundancy check (CRC) and power level threshold.

9. The method of claim 1, wherein the R-PHY node detects collisions between bandwidth requests from the plurality of cable modems, wherein the detected bandwidth request collisions are indicated in a request block of a UEPI REQ PW.

10. The method of claim 9, wherein the R-PHY node detects the bandwidth request collisions using at least a packet header check sum (HCS) and power level threshold.

11. A non-transitory tangible computer readable medium embedded with instructions, which when executed by a processor, performs method steps comprising:
    receiving, at a Converged Cable Access Platform (CCAP) core from a remote physical layer (R-PHY) node over a converged interconnect network (CIN) in a Data Over Cable Service Interface Specification (DOCSIS) R-PHY network environment, an indication of a collision level in an upstream network between the R-PHY node and a plurality of cable modems (CMs);
    calculating a congestion level in the upstream network based on the collision level indicated by the R-PHY node;
    adjusting back-off window parameters for cable modem retransmissions based on the calculated congestion level; and
    adjusting a contention transmission opportunity density in a downstream MAP message based on the adjusted back-off window parameters, wherein the adjusting the contention transmission opportunity density comprises calculating a maximum number of contention transmission opportunities in a specific back-off window bounded by the adjusted back-off window parameters, and changing a value of the contention transmission opportunity density on a specific channel for a specific contention type to ensure the maximum number of contention transmission opportunities within a maximum acceptable access delay.

12. The non-transitory tangible computer-readable medium of claim 11, wherein the operations further comprise transmitting by the CCAP core to the R-PHY node, the downstream MAP message having the contention transmission opportunity density and including the adjusted back-off window parameters in a UEPI MAP PW, wherein the contention transmission opportunity density bounds a transmission back-off delay at the CMs.

13. The non-transitory tangible computer-readable medium of claim 11, wherein the back-off window parameters are adjusted if the calculated congestion level falls outside a preconfigured congestion window.

14. The non-transitory tangible computer-readable medium of claim 11, wherein the contention transmission opportunity density is adjusted to achieve the maximum acceptable access delay.

15. The non-transitory tangible computer-readable medium of claim 11, wherein the indication from the R-PHY node is received at the CCAP core in a UEPI PW.

16. An apparatus, comprising:
    a Converged Cable Access Platform (CCAP) core;
    a memory element for storing data; and
    a processor, wherein the processor executes instructions associated with the data, wherein the processor and the memory element cooperate, such that the apparatus is configured for:
    receiving, at the CCAP core from a remote physical layer (R-PHY) node over a converged interconnect network (CIN) in a Data Over Cable Service Interface Specification (DOCSIS) R-PHY network environment, an indication of a collision level in an upstream network between the R-PHY node and a plurality of cable modems (CMs);
    calculating a congestion level in the upstream network based on the collision level indicated by the R-PHY node;
    adjusting back-off window parameters for cable modem retransmissions based on the calculated congestion level; and
    adjusting a contention transmission opportunity density in a downstream Media Access Protocol (MAP) message based on the adjusted back-off window parameters, wherein the adjusting the contention transmission opportunity density comprises calculating a maximum number of contention transmission opportunities in a specific back-off window bounded by the adjusted back-off window parameters, and changing a value of the contention transmission opportunity density on a specific channel for a specific contention type to ensure the maximum number of contention transmission opportunities within a maximum acceptable access delay.

17. The apparatus of claim 16, further configured for transmitting by the CCAP core to the R-PHY node, the downstream MAP message having the contention transmission opportunity density and including the adjusted back-off window parameters in a UEPI MAP PW, wherein the contention transmission opportunity density bounds a transmission back-off delay at the CMs.

18. The apparatus of claim 16, wherein the back-off window parameters are adjusted if the calculated congestion level falls outside a preconfigured congestion window.

19. The apparatus of claim 16, wherein the contention transmission opportunity density is adjusted to achieve the maximum acceptable access delay.

20. The apparatus of claim 16, wherein the indication from the R-PHY node is received at the CCAP core in a UEPI PW.

* * * * *